United States Patent [19]
Ohishi et al.

[11] Patent Number: 5,701,521
[45] Date of Patent: Dec. 23, 1997

[54] PHOTOGRAPHIC DEVICE HAVING A VIBRATION COMPENSATION FUNCTION WITH REDUCED POWER CONSUMPTION

[75] Inventors: Sueyuki Ohishi; Toshiyuki Nakamura, both of Tokyo, Japan

[73] Assignee: Nikon Corporation, Tokyo, Japan

[21] Appl. No.: 377,263

[22] Filed: Jan. 25, 1995

[30] Foreign Application Priority Data

Apr. 22, 1994 [JP] Japan .................................. 6-084639

[51] Int. Cl.$^6$ .................................................. G03B 17/00
[52] U.S. Cl. .................................................. 396/52; 396/55
[58] Field of Search .................................. 354/410, 412, 354/484, 202, 70; 396/52, 55

[56] References Cited

U.S. PATENT DOCUMENTS

| | | | |
|---|---|---|---|
| 4,916,474 | 4/1990 | Miyazawa et al. | 354/412 |
| 4,965,619 | 10/1990 | Sikaumi et al. | 354/410 |
| 5,053,804 | 10/1991 | Odaka et al. | 354/484 |
| 5,172,276 | 12/1992 | Ueyama et al. | |
| 5,389,997 | 2/1995 | Ohishi | 354/202 |
| 5,416,558 | 5/1995 | Katayama et al. | 354/70 |
| 5,526,192 | 6/1996 | Imura et al. | 359/813 |

FOREIGN PATENT DOCUMENTS 3-110530  5/1991  Japan .

OTHER PUBLICATIONS

U.S. application No. 08/220,039, Imura et al., filed Mar. 30, 1994.
U.S. application No. 07/959,106, Katayama et al., filed Oct. 9, 1992.

Primary Examiner—Russell E. Adams

[57] ABSTRACT

A photographic device has a vibration compensation system with reduced power consumption. The photographic device includes a vibration compensation system with a vibration detection device to detect vibration caused by, for example, a photographer's hand tremor, a vibration compensation device to cause the optical axis of a photographic optical system to change to compensate for the detected vibration, and a control unit to perform processes including vibration compensation control to control the vibration compensation device based on the output of the vibration detection device. The control unit has a low electric current consumption mode which causes its processes to stop to restrain the consumption of electric current, and a normal operation mode during which processes are performed. The photographic device includes a mode changeover device to change the control unit from the normal operation mode to the low electric current consumption mode when a photographic operation has ended. The mode changeover device may also change the control unit from the low electric current consumption mode to the normal operation mode when photographic preparation operations commence. The photographic device also includes an exposure device to perform an exposure on an image forming plane of a photographic optical system, and the control unit operates in a high-speed mode when both exposure control and vibration compensation control are performed at the same time, and in a low-speed mode when exposure control and vibration compensation control are not performed simultaneously.

11 Claims, 4 Drawing Sheets

PHOTOGRAPHIC DEVICE HAVING A VIBRATION COMPENSATION FUNCTION WITH REDUCED POWER CONSUMPTION

BACKGROUND OF THE INVENTION

1. Field of the Invention

The present invention relates to photographic devices having a vibration compensation system and, more particularly, the present invention relates to photographic devices having a vibration compensation system which operates with reduced power consumption.

2. Description of Related Art

Cameras are known having a vibration compensation system which compensates for vibration of an image on an image forming plane. These known vibration compensation systems include a vibration detection device to detect vibration caused by, e.g., hand tremor, a vibration compensation control device to perform a process of vibration compensation control based on the output of the vibration detection device, and a vibration compensation device to compensate for vibration by causing the optical axis of a photographic optical system to change based on the output of the vibration compensation control device.

The vibration detection device comprises angular velocity sensors to detect angular velocities arising in the photographic device and to output a signal proportional to the detected angular velocity. The vibration compensation control device generates control signals to control the vibration compensation device according to the output of the vibration detection device. The vibration compensation device shifts a compensation lens, which is a pan of a photographic lens system, causing the optical axis of the photographic lens system to change. More specifically, by changing the optical axis of a compensation lens, the vibration compensation device can negate movement of an image on an image forming plane caused by vibration.

The vibration compensation device includes motors to drive the compensation lens. The rotation of the motors is reduced by gears and the rotary motion of the gears is converted into rectilinear motion to drive the compensation lens. Further, the vibration compensation control device detects the actual shift speed of the compensation lens, and from the actual shift speed of the compensation lens, using feedback control to control the drive motor, shifts the compensation lens at a suitable speed.

However, in the known photographic devices having the above-described type of vibration compensation system, it is necessary for the vibration compensation control device to detect the output of the vibration detection device in real time, and to control the vibration compensation device in real time based on the detected amount of vibration. For example, Japanese Patent Application No. 6-12824 discloses a vibration compensation device wherein the detected angular velocities occurring due to vibration are A/D converted at a 1 ms sampling interval. The target velocity of the compensation lens is then calculated from the A/D converted value, and feedback control is performed with respect to the target velocity value to perform velocity control of the compensation lens with good accuracy.

Further, it is normally necessary for the vibration compensation control device to perform the vibration compensation control for two (2) axes simultaneously. Furthermore, when the vibration compensation control device is also used to perform photographic control of a shutter and the like, it is necessary that the vibration compensation control device be capable of processing programs at a very high speed, and thus the electric current consumption is large. In particular, a problem that occurs with the known types of cameras having a vibration compensation function is that the electric power consumption to operate the vibration compensation control device becomes very large.

There are many single-chip microprocessors which may be used for the vibration compensation control device whose electric current consumption is 20 mA or more, with some exceeding 50 mA. Since it is important that these cameras having a vibration compensation function be designed for portability, especially in the case of a video camera or silver salt camera, the electric power source is generally an electric battery. Moreover, because it is important to make these kinds of cameras small in size, the space for insertion of a battery and the volume of the battery are limited.

For example, a single-chip microprocessor will be considered whose electric current consumption is 50 mA. Normally, the operation of this kind of single-chip microprocessor capable of high speed processing is ensured by a voltage range of only about 5 V. To provide a stabilized electrical source, the electrical source is provided from the battery via a stabilized electrical source circuit, for example, a DC/DC converter. However, when using these DC—DC converters, often a ratio of the output electric power with respect to the input electric power is only 50%. Therefore, when an input current of 100 mA to a DC/DC converter is necessary to achieve an output current of 50 mA from the DC/DC converter, an electric battery with a capacity of 1 Ah will be exhausted in ten (10) hours when used solely for operating the single-chip microprocessor.

What is needed is a photographic device having a vibration compensation system which operates with reduced electric current consumption.

SUMMARY OF THE INVENTION

Accordingly, it is an object of the present invention to provide a photographic device having a vibration compensation system which operates with good efficiency while reducing the electric current consumption.

It is another object of the present invention to provide a photographic vibration compensation system having a vibration compensation control device which operates with reduced electric current consumption.

Additional objects and advantages of the invention will be set forth in descriptions which follows, and, in part, will be obvious from the description, or may be learned by practice of the invention.

Objects and advantages of the present invention are achieved with a photographic device having a vibration compensation system including a vibration detection device to detect vibration caused by, for example, a photographer's hand tremor, a vibration compensation device to cause the optical axis of a photographic optical system to change to compensate for the detected vibration, and a control unit comprising, e.g., a single-chip microprocessor to perform processes including vibration compensation control to control the vibration compensation device based on the output of the vibration detection device.

The control unit has a low electric current consumption mode, which causes its processes to stop to restrain the consumption of electric current, and a normal operation mode, during which processes are performed in a normal manner. The photographic device includes a mode changeover device to change the control unit from the normal operation mode to the low electric current consumption mode when a photographic operation has ended. The mode changeover device also changes the control unit from the low electric current consumption mode to the normal operation mode when photographic preparation operations commence.

Further, it is possible to change the processing speed of the control unit between at least two modes according to whether vibration compensation control is performed. Specifically, the control unit is operated at a low processing speed when the process of vibration compensation control is not performed, and is operated at higher processing speeds when the process of the vibration compensation control is performed.

Objects and advantages of the present invention are also achieved in accordance with the present invention with a photographic device having a vibration compensation system including an exposure device to perform an exposure on a focal plane of a photographic optical system, a vibration detection device to detect vibration caused by, e.g., hand tremor, a vibration compensation device to cause the optical axis of a photographic optical system to change to compensate for movement of an image on an image forming plane caused by vibration, and a control unit, which may be a single-chip microprocessor, to perform processes including vibration compensation control to control the vibration compensation device based on the outputs of the vibration detection device and exposure control to control an exposure device.

The processing speed of the control unit may be changed according to at least two modes. Specifically, when the exposure control is processed and the vibration compensation control is not processed, the control unit operates at a low processing speed. When the vibration compensation control is processed and the exposure control is not simultaneously processed, the control unit operates at a medium processing speed. When the exposure control and the vibration compensation control are simultaneously processed, the control unit operates at a high processing speed.

Embodiments of present invention may also include a vibration compensation switch which, under the control of the control unit, changes between the operation or non-operation of the vibration compensation control process. When the vibration compensation switch is OFF, a non-operation mode is set and the processing speed of the control unit is a low speed; when the vibration compensation switch is ON, an operation mode is set causing medium speed or high speed operation of the control unit.

In accordance with embodiments of the present invention, the mode changeover device changes the control unit from a normal operation mode to a low speed operation mode when a photographic operation has ended. Thus, after photography ends, unnecessary electric current consumption can be prevented. Because the mode changeover device changes the control unit from a low electric current consumption mode to a normal operation mode when a standard photographic operation commences, the control unit operates in a normal operation mode during the photographic process.

Further, the control unit is operated at a low processing speed when the process of vibration compensation control is not performed so that the electric current consumption can be made low. In comparison, when vibration compensation control is performed, the control unit is operated at a medium or high processing speed.

The processing speed of the control unit is changed to a low speed or medium speed when exposure control and vibration compensation control are not simultaneously performed, and the electric current consumption is made low. In comparison, when exposure control and vibration compensation control are processed simultaneously, the control unit is operated at high speed.

When the changeover device has changed to a non-operation mode, in comparison with when it is in an operation mode, because the processing speed is changed to a low speed, the electric current consumption can be kept low. When the changeover device is in the operation mode, vibration compensation control is operated and the processing speed is changed to high speed operation.

BRIEF DESCRIPTION OF THE DRAWINGS

These and other objects and advantages of the present invention will become apparent and more readily appreciated from the following description of the preferred embodiments taken in conjunction with the accompanying drawings, of which.

DESCRIPTION OF THE PREFERRED EMBODIMENTS

Figure 1:
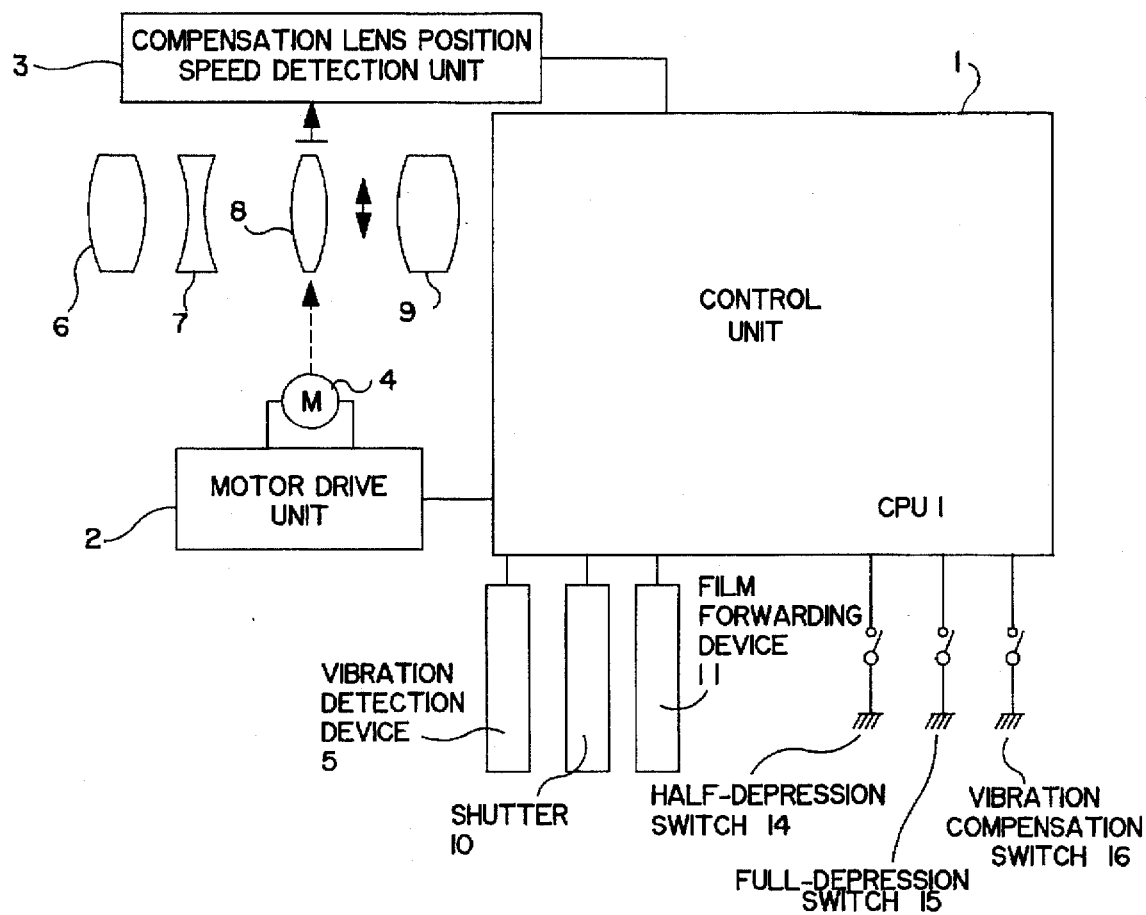
FIG. 1 is a block diagram showing a photographic device including a vibration compensation system in accordance with embodiments of the present invention.

Reference will now be made in detail to the preferred embodiments of the present invention, examples of which are illustrated in the accompanying drawings, wherein like reference numerals refer to the same or similar elements throughout.

FIG. 1 is a block diagram showing a photographic device including a vibration compensation system in accordance with embodiments of the present invention. The photographic device may be used in various cameras, such as a silver salt camera, a video camera, etc., or in other devices having a photographic optical system.

The photographic device includes a control unit 1 which preferably comprises a single-chip microprocessor to perform control of photography, vibration compensation and like operations.

A vibration detection device 5 is operatively connected to the control unit 1 and detects vibration which has occurred in the camera, and outputs a signal representative of the detected vibration to the control unit 1. The vibration which the vibration detection device 5 detects is typically caused by a photographer's hand tremor; however, embodiments of the present invention will compensate for vibration from any source. The vibration detection device 5 may be comprised of angular velocity sensors to detect the angular velocity of the camera and to output signals proportional to the detected angular velocity.

The output value of the vibration detection device 5 changes according to the change in angular velocity of the camera caused by vibration. The output value of the vibration detection device 5 is an analog value which is convened, by an A/D converter built into the control unit 1, into a digital value which may be processed by the control unit 1. When detecting vibration, it is necessary for the detection to be in real time. Accordingly, the output of the vibration detection device 5 is A/D converted with a comparatively short predetermined sampling interval, for example, a 1 ms interval.

A motor drive unit 2 receives drive signals from the control unit 1 and supplies a signal for rotationally driving a motor 4 based on the drive signals from the control unit 1. The rotation of the motor 4 is converted into rectilinear motion by suitable gears and the like (not shown), to shift a compensation lens 8 which is part of a photographic lens system comprising lenses 6, 7, 8 and 9. By shifting the compensation lens 8, a change of the optical axis of the photographic lens system 6, 7, 8 and 9 occurs, and blurring movement of an image in an image forming plane is negated.

A compensation lens position speed detection unit 3 detects the position of the compensation lens 8 and its actual speed of shifting. The detected speed of shifting is input to the control unit 1 which performs feedback control of the shifting of the compensation lens 8. Moreover, two axial components intersecting at right angles are necessary to represent the shift direction of the compensation lens 8. However, the two axial components are similar and only one axial component is shown.

Various other devices are connected to the control unit 1 other than those to perform the vibration compensation, such as a shutter 10 to perform an exposure operation; film forwarding device 11 to perform winding and rewinding of the photographic film; a half-depression switch 14 which commences operations preparatory to photography, and is set ON or OFF by half depression of a release button (not shown) arranged in the camera; a full-depression switch 15 which commences photographic operation and is set ON or OFF by full depression of the release button; and a vibration compensation switch 16 which changes an operating mode between operation and non-operation of the vibration compensation system.

A processing speed changeover function and a low electric current consumption mode function of the control unit 1 will now be described below. The single-chip microprocessor which comprises the control unit 1 has the following operating modes:

[1] Standby mode or clock operation mode (collectively termed "low electric current consumption modes").
[2] Low-speed operation mode.
[3] Medium-speed operation mode.
[4] High-speed operation mode.

The standby mode [1] causes the programs built into the control unit 1 to stop, and, in comparison with the case in which normal program processes are performed, is a mode in which the electric current consumption of the single-chip microprocessor is actively kept low. When the single-chip microprocessor is in the standby mode, the electric current consumed can be reduced to a few µA.

The clock operation mode [1] causes operation of only the clock function built into the single-chip microprocessor, and is a mode in which program processes other than the clock function are in a state of standstill. Further, in the clock operation mode [1], a low electric current consumption becomes possible, equal to the electric current consumption when in the standby mode.

The respective modes [2], [3] and [4] are collectively termed "normal operation modes", and differ from mode [1] in that modes [2], [3] and [4] are modes in which program processes are performed. Modes [2], [3] and [4] are modes in which the processing speed is a low-speed, a medium-speed, and a high-speed, respectively. The relationship between these processing speeds and the electric current consumption is that the electric current consumption generally increases accompanying a higher speed operation. More specifically, the electric current consumption in these three modes is lowest in the low speed mode, intermediate in the medium speed mode, and greatest in the high speed mode.

Accordingly, the various functions of the single-chip microprocessor can be performed, according to the various operating modes, by changing the operating mode to the respective low speed, medium speed or high speed operating mode, or to the standby mode or the clock mode.

Figure 2:
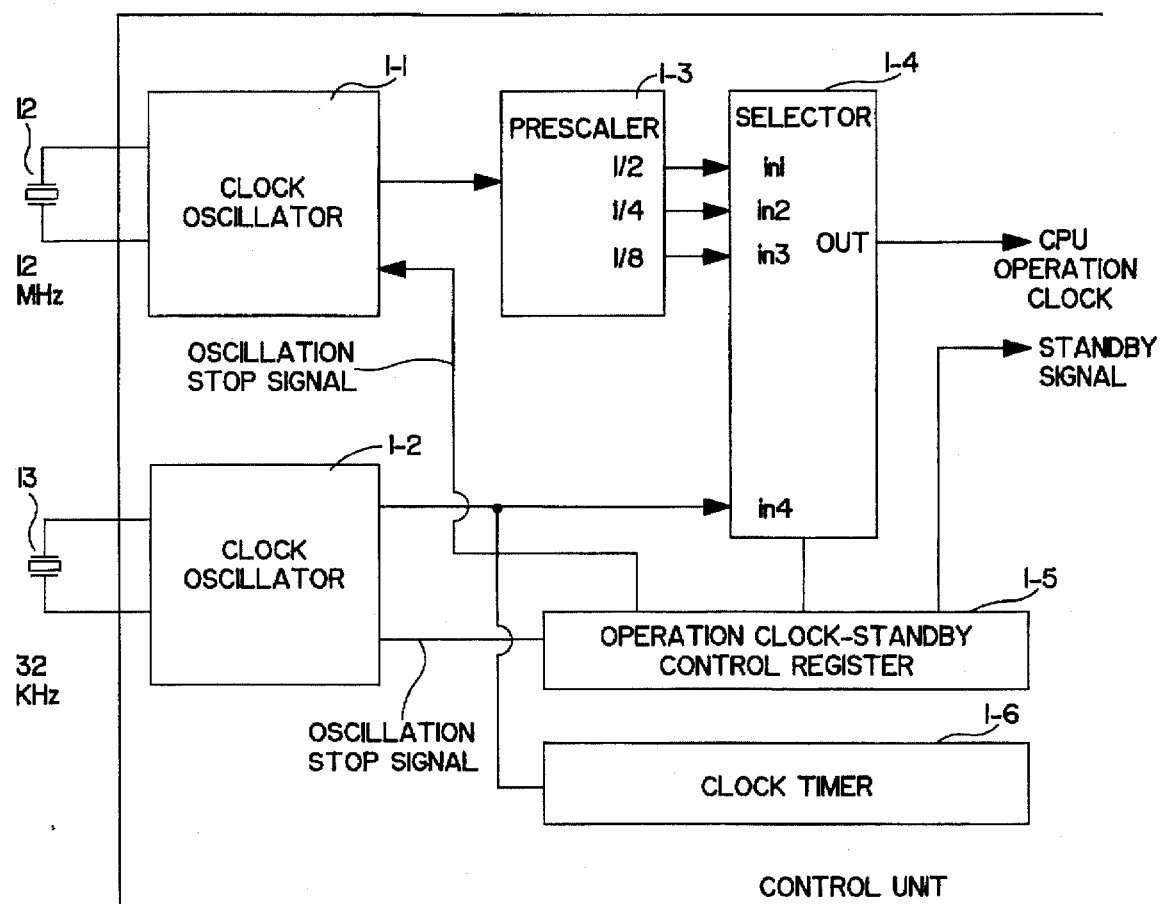
FIG. 2 is a block diagram showing a processing speed changeover device of a photographic device in accordance with embodiments of the present invention.

FIG. 2 is a block diagram showing a mode changeover device of the photographic device in accordance with embodiments the present invention.

An oscillator 12, used for the low-speed, medium-speed and high-speed operating modes, and an oscillator 13, used for the clock operating mode, are connected to the control unit 1. The oscillator 12 for the low-speed, medium-speed and high-speed operating modes may be a 12 MHz oscillator. The oscillator 13 for the clock operating mode may be a 32 KHz oscillator. Clock oscillators 1-1 and 1-2, built into the control unit 1, output oscillations at the respective frequencies of the input oscillators 12 and 13.

The output of the clock oscillator 1-1 is input to a prescaler 1-3 and is respectively frequency divided to ½, ¼ and ⅛ by the prescaler 1-3. The respective frequency divided outputs of the prescaler 1-3 are input to the respective inputs in1, in2 and in3 of a selector 1-4. Further, the output of the clock oscillator 1-2 is output to an input in4 of the selector 1-4.

The selector 1-4 selects a signal which is output to an output OUT of selector 1-4 according to values set by an operation clock-standby control register 1-5. The output OUT of the selector 1-4 is used as a timing signal for the program processes of the control unit 1, the program processes being performed at a speed which is dependent on the frequency of the output signal OUT. More specifically, the selector 1-4 selects, according to predetermined values set by the operation clock-standby control register 1-5, one of four (4) modes of operation: a high processing speed when in1 has been selected; a medium processing speed when in2 has been selected; a low processing speed when in3 has been selected; and an ultra-low processing speed when in4 has been selected.

The operation clock-standby control register 1-5, according to its setting, can stop the program processes of the control unit 1 by outputting a standby signal (this mode corresponds to the standby mode), and can keep the electric current consumption low. Further, by setting of the operation clock-standby control register 1-5, oscillation stop signals can be output to the clock oscillator 1-1 and the clock oscillator 1-2, causing their oscillation to stop to reduce the electric current consumption still further. At this time, only the clock oscillator 1-2 is in the operating state, and only the clock timer is operated.

Next, the relationships between the operations of the camera, the necessary processing speed for the control unit 1 and the operating modes will be described. In a photographic device having a vibration compensation function in accordance with preferred embodiments of the present invention, processes which demand a comparatively high processing speed are principally photographic processes occurring when the half-depression switch 14 has been set ON. Consequently, in accordance with the preferred embodiments, the operating mode of the control unit 1 is changed as follows:

[1] When vibration compensation control is not performed during half depression, the control unit 1 operates in a low-speed operating mode.

[2] When vibration compensation control is performed during half depression, the control unit 1 operates in a medium-speed operating mode.

[3] When vibration compensation control is not performed during exposure, the control unit 1 operates in a medium-speed operating mode.

[4] When vibration compensation control is performed during exposure, the control unit 1 operates in a high-speed operating mode.

[5] When processes other than vibration compensation are performed, the control unit 1 operates in a medium-speed operating mode.

[6] When other processes which are not particularly needed are performed, the control unit 1 operates in the standby or clock operating mode.

An operational process for suppressing the electric current consumption of the control unit 1 will now be described with reference to FIG. 3 which is a flow chart showing a photographic process performed with the photographic device in accordance with a preferred embodiment of the present invention.

Figure 3:
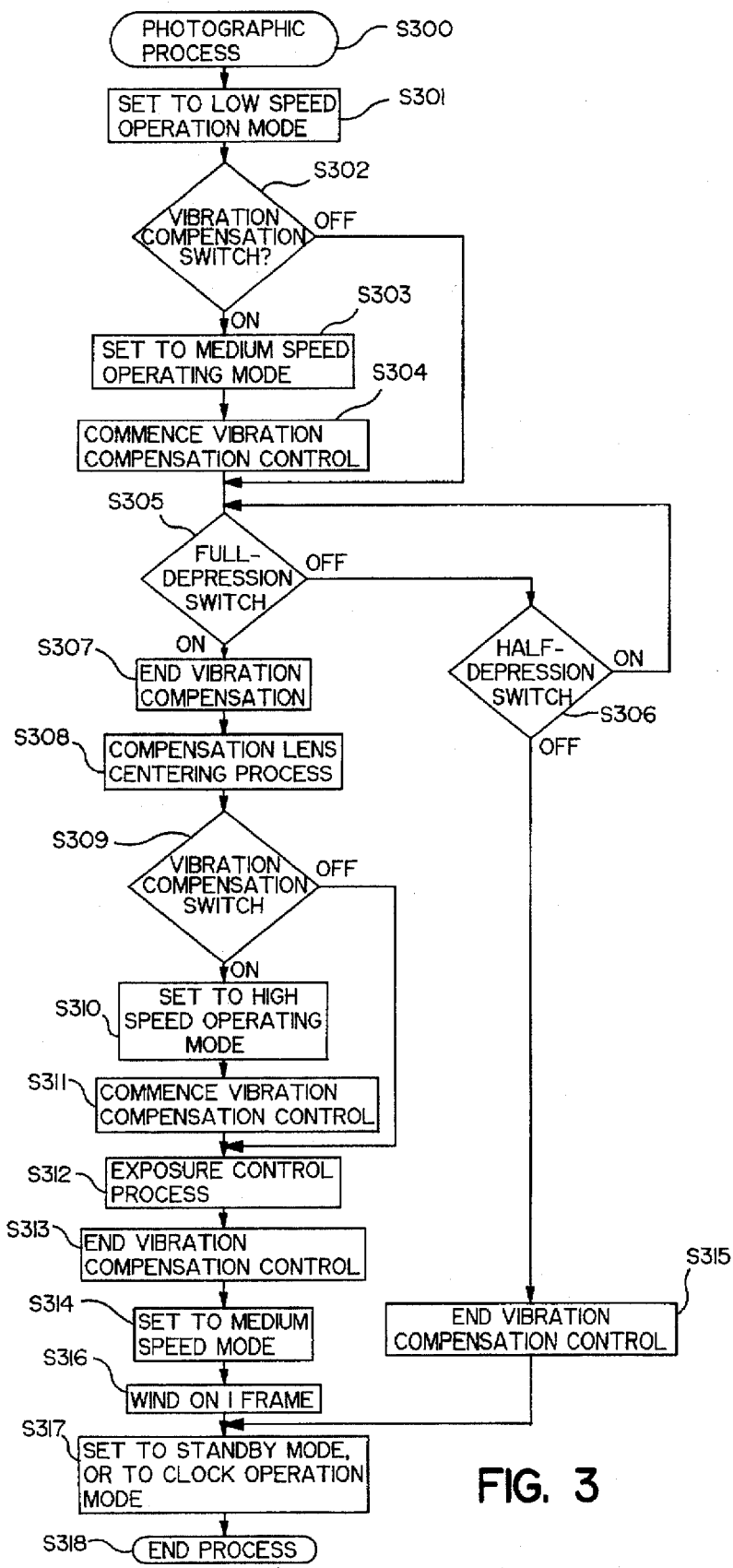
FIG. 3 is a flow chart showing the photographic process of the photographic device in accordance with embodiments of the present invention.

The photographic process shown in FIG. 3 begins when the half-depression switch 14 is set ON and the program processes of the control unit 1 are started. Prior to the half-depression switch 14 being set ON, the operating state of the control unit 1 is the standby mode or the clock-operation mode.

When a predetermined signal is input to the control unit 1 (in accordance with the preferred embodiments, the ON signal of the half-depression switch), the control unit 1 undergoes a transition from the standby mode or the clock operation mode to the normal mode, in which program processes are operated (corresponding to the low-speed, medium-speed or high-speed operating modes). A single-chip microprocessor which has a so-called "wake-up" function may be utilized to effect this transition.

In step S300, a photographic process is begun by the control unit 1, and the operating mode is set (step S301) to the low-speed mode. Next, the state of the vibration compensation switch 16 is determined (step S302). When the vibration compensation switch 16 is ON, the medium-speed operating mode is set (step S303), and vibration compensation control commences (step S304). In step S304, the vibration compensation control is performed according to the vibration compensation control timer interruption process shown in FIG. 4, as will be described in more detail later.

However, in step S302, when the vibration compensation switch 16 is OFF, the operational process proceeds to step S305, by-passing steps S303 and S304. In step S305, it is determined whether the full-depression switch 15 is ON or OFF. When the full-depression switch 15 is ON, the operational process proceeds to step S307. When the full-depression switch 15 is OFF, it is determined whether the half-depression switch 14 is ON or OFF (step S306). If the half-depression switch 14 is ON, the operational process returns to step S305, and when the half-depression switch 14 is OFF, the operational process proceeds to step S315. In step S315, the vibration compensation control is ended, the standby mode or the clock operation mode is set (step S317), and the photographic process is ended (step S318). The vibration compensation control is ended in step S315 by inhibiting the vibration compensation control timer interruption process shown in FIG. 4, as will be later described.

As described above, the control unit 1 performs vibration compensation control in the medium-speed operating mode when the half-depression switch 14 is set ON and the vibration compensation switch 16 is ON. When the vibration compensation switch 16 is OFF, the control unit 1 is in the low-speed operating mode and does not perform vibration compensation control. More particularly, the control unit 1 changes the operating mode according to whether or not it performs vibration compensation control. When vibration compensation control is performed which necessitates a comparatively high processing speed, the control unit 1 is changed to the medium-speed mode. Further, when vibration compensation control is not performed, because a high processing speed is not required, the control unit 1 is operated in the low-speed operating mode, such that electric current consumption is reduced.

In step S305, when the full-depression switch 15 is ON, the operational process proceeds to step S307, and by inhibiting the vibration compensation control timer interruption process (FIG. 4), vibration compensation ends for a moment. Next, a compensation lens centering process (step S308) drives the compensation lens 8 to the center of its shift range. The compensation lens centering process will be described in greater detail later with reference to FIG. 5.

Continuing in step S309, it is determined whether the vibration compensation switch 16 is ON or OFF. When the vibration compensation switch 16 is ON, the operational process continues in step S310 where the high-speed operating mode is set. In step S311, vibration compensation commences by permitting the vibration compensation control timer interruption process (FIG. 4), and the operational process proceeds to step S312.

Figure 4:
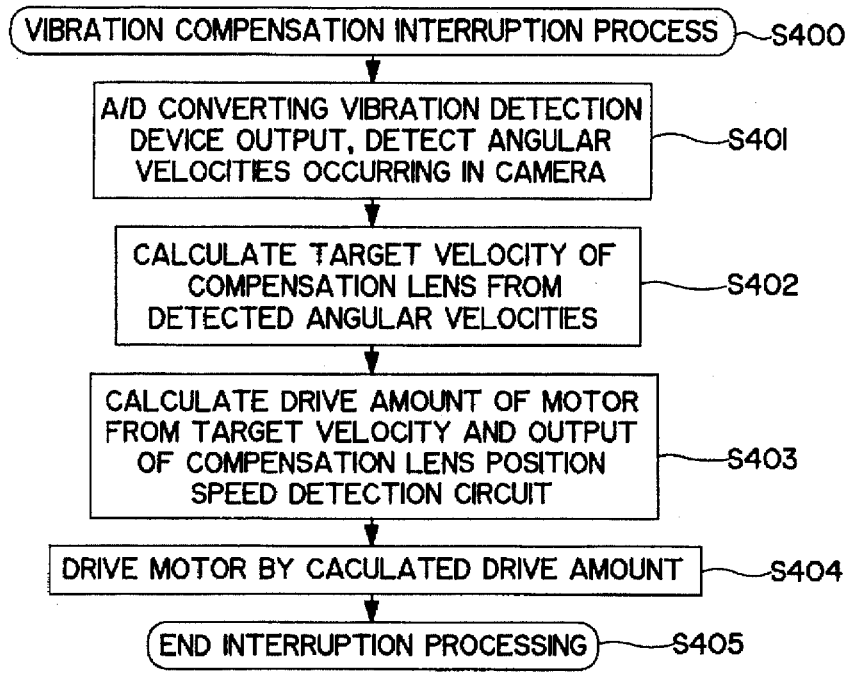
FIG. 4 is a flow chart showing a vibration compensation control timer interruption process in accordance with embodiments the present invention.

However, in step S309, when the vibration compensation switch 16 is OFF, the operational process proceeds directly to step S312, by-passing steps S310 and S311. In step S312, the shutter 10 is operated, and an exposure process is performed. When the exposure process ends, the vibration compensation control ends (step S313) by the inhibition of the vibration compensation control interruption process (FIG. 4).

Next, in step S314, the medium-speed operating mode is set, the film forwarding device 11 is operated (step S316), and after the photographic film has been wound by one (1) frame, the standby mode or the clock operation mode is set (step S317), and the photographic process ends (step S318).

As described above, when the half-depression switch 14 is ON, and when the control unit 1 does not perform vibration compensation control, the control unit 1 operates in a low-speed mode with low electric current consumption. When half-depression switch 14 is ON, and when the control unit 1 performs vibration compensation control (the vibration compensation switch 16 is ON), the control unit 1 operates in the medium-speed mode with a medium degree of electric current consumption.

Further, during exposure, when the control unit 1 does not perform vibration compensation control, the control unit 1 operates in the medium-speed mode with an intermediate degree of electric current consumption. During exposure, when vibration compensation is performed, the control unit 1 operates in the high-speed mode with a high degree of electric current consumption.

Furthermore, when the control unit 1 performs processes other than those described above, e.g., the process of winding the photographic film by one (1) frame, etc., the control unit 1 operates in the medium-speed mode having an intermediate degree of electric current consumption. When processing by the control unit 1 is not necessary, the mode is set to the standby or clock operation mode.

The operational process for control of vibration compensation using timer interruption will now be described with reference to FIG. 4 which is a flow chart showing a vibration compensation control timer interruption process. The operational process shown in FIG. 4 uses a timer interruption function built into the control unit 1 with a predetermined time interval, for example, repetition performed at 1 ms intervals.

Further, the vibration compensation control timer interruption process in accordance with the preferred embodiments of the present invention is permitted in step S304 or S311, and is inhibited in step S313 or S315.

The vibration compensation interruption process begins in step S400. Next, in step S401, the angular velocity due to vibration of the camera is determined by the A/D converted output of the vibration detection device 5. The target velocity of the compensation lens 8 is then calculated (step S402) from the detected angular velocity. The target velocity, when the compensation lens 8 is moved by any shift velocity, is a value which suppresses vibration in the image forming plane. The position of the compensation lens 8 is detected (step S403) by the output of the compensation lens position velocity detection unit 3, and a drive amount of the motor 4 is calculated according to a predetermined calculation, based on the detected actual velocity of the compensation lens 8 and on the target velocity of the compensation lens 8 calculated in step S402. In step S404, the motor 4 is driven via the motor drive unit 2 according to the drive amount calculated in step S403. In step S405, the vibration compensation control timer interruption process ends.

By performing the vibration compensation control timer interruption process described above at predetermined time intervals, vibration occurring in the camera is detected practically in real time, and further, the compensation lens 8 is controlled according to the detected vibration practically in real time. Accordingly, it becomes possible to compensate for vibration in the image forming plane.

Figure 5:
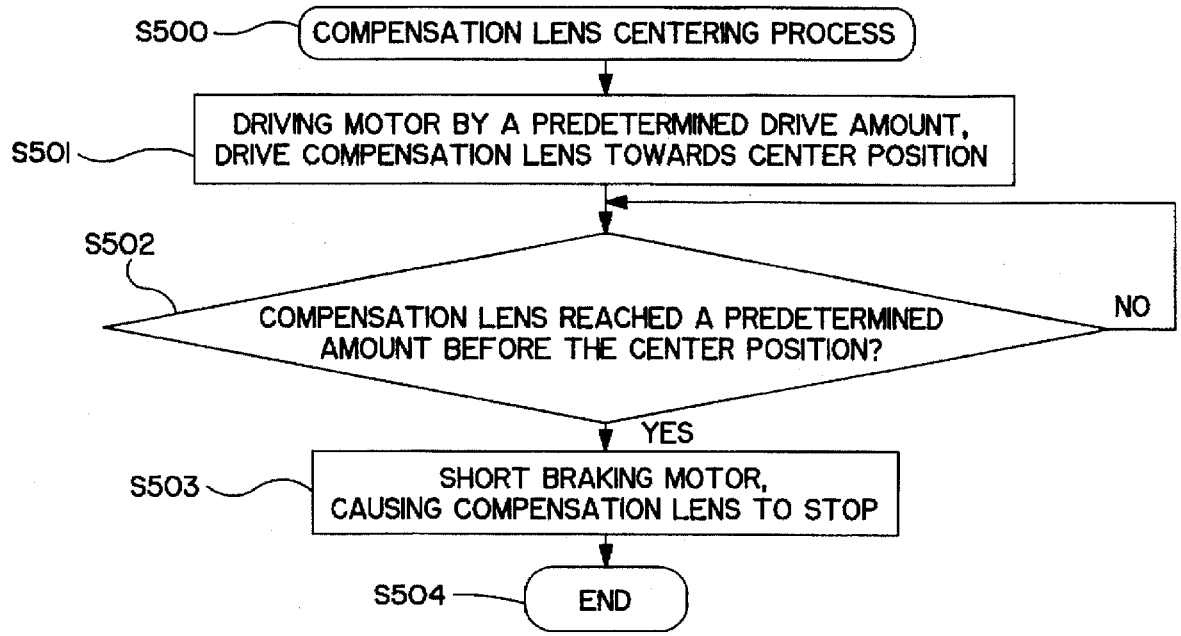
FIG. 5 is a flow chart showing a compensation lens centering process in accordance with embodiments the present invention.

The centering process of the compensation lens 8 will now be described below with reference to the flow chart of FIG. 5. The compensation lens centering process is a process which drives the compensation lens 8 to a predetermined center position which is approximately in the center of its shift range.

The centering process begins in step S500, and, in step S501, the motor 4 is driven toward the center position via the motor drive unit 2 by a predetermined drive amount. Next, in step S502, the position of the compensation lens 8 is detected from the output of the compensation lens position velocity detection unit 3, and it is determined whether or not this detected position has reached a predetermined amount before the center position. When the position of the compensation lens 8 has reached the predetermined amount before the center position, the motor 4 is placed, via the motor drive unit 2, in a short brake state (step S503) causing the lens 8 to stop. When the position of the compensation lens 8 has not reached the predetermined amount before the center position, step S502 is continued until the compensation lens 8 has reached the predetermined amount before the center position. The compensation lens centering process then ends (step S504).

In accordance with the above-described centering process of the compensation lens 8, the compensation lens 8 can be driven to close to a predetermined center position.

It will be recognized that the present invention is not limited to the embodiments described above and various modifications or changes are possible in keeping with the scope and spirit of the invention.

For example, the operating speed of the control unit 1 has been described in terms of changing between three modes: a high-speed mode, medium-speed mode and a low-speed mode. However, the control unit may change between two modes. When there are two modes, the operating speed may be changed in the cases of performing and not performing the vibration compensation control. Moreover, the control unit 1 may also operate by changing the required processing speeds between four or more modes.

Further, although the control unit 1 in accordance with embodiments of the invention has been described as performing, in addition to the vibration compensation control, the processes of control of the shutter 10 and of the film forwarding device 11, the control unit 1 may also perform control of rangefinding, photometry and the like, operating each process at the required speed.

Furthermore, in accordance with embodiments of the present invention, the low electric current consumption mode and operation speed changeover function built into the single-chip microprocessor comprising the control unit 1 have been described with reference to the hardware shown in FIG. 2, but these functions may be realized with hardware other than that described with reference to FIG. 2.

Furthermore, the control unit 1 can be comprised of two (2) single-chip microprocessors with the processes required in the camera divided between two (2) single-chip microprocessors. When the control unit comprises two single-chip microprocessors, the control of vibration compensation is performed by a first single-chip microprocessor, and the control of rangefinding, photometry, shutter 10, film forwarding device 11 and the like is performed by a second single-chip microprocessor. The first single-chip processor may change the processing speed according to whether or not it performs the vibration compensation control, or according to the state of the vibration compensation switch.

For example, in a single-lens reflex camera, a photographic lens barrel having a vibration compensation function may have a first single-chip microprocessor built in, and a camera body may have a second single-chip microprocessor built in. In this case, by half depression of the release button, there is a transition of the first single-chip microprocessor from a low electric current consumption mode or an ultra-low speed operation mode to a normal operating mode with a processing speed at which vibration compensation control can be performed. At the end of the photographic process, there may be a transition to the low electric current consumption mode or to the ultra-low speed operation mode. Moreover, whether there is a change in the processing speed of the first single-chip microprocessor is determined according to the state of the vibration compensation switch. When the vibration compensation switch is OFF, the low-speed operating mode is selected, and when vibration compensation is performed, the normal operating mode is selected.

Moreover, when vibration compensation control is not performed, an ultra-low speed operation may be performed by setting the selected input to in4 with the selector 1-4 (FIG. 2). In this case, in FIG. 3 the low-speed mode can be changed to operate in the ultra-low speed mode. Moreover, in FIG. 3 the operating mode of other than the photographic process is performed in the standby mode or clock operation mode, but may also be performed in the ultra-low speed mode.

The above embodiments of the present invention have been described using a silver salt camera by way of example, but is not limited to a silver salt camera. For example, the present invention can also be applied to an electronic still camera, video camera or the like. Moreover, the vibration compensation control process is not limited by the type of camera used.

Furthermore, the drive motor 4 which shifts the compensation lens 8 has been described as a system which compensates for vibration of an image on an image forming plane by causing the optical axis to change. However, a variable angle prism or the like may be used instead of the compensation lens 8. Moreover, it is possible to use a voice coil or other actuator instead of the drive motor 4.

Still further, the vibration detection device 5 has been described as comprising angular velocity sensors to detect the angular velocities occurring in the camera. However, other types of vibration detection devices may be used, for example, those having output signals indicating acceleration or position.

In accordance with embodiments of the present invention, using a mode changeover device, a single-chip microprocessor changes from a normal operating mode to a low electric current consumption mode after a photographic operation has ended, thereby suppressing unnecessary electric current consumption. Further, at the time of commencing photographic preparatory operations, the mode changeover device changes operation from a low electric current consumption mode to a normal operation mode.

When the single-chip microprocessor does not perform the process of vibration compensation control, in comparison with when the process of vibration compensation control is carried out, the single-chip microprocessor can be operated at a low processing speed, and low electric current consumption can be effected. Moreover, when vibration compensation control is performed, the single-chip microprocessor is operated at a high processing speed.

The single-chip microprocessor is able to change the processing speed in accordance with at least two modes when performing exposure control and vibration compensation control. Specifically, when exposure control and vibration compensation control are not simultaneously performed the processing speed can be a low speed, and low electric current consumption can be effected. When exposure control and vibration compensation control are performed simultaneously, high-speed operation is performed.

When the changeover device changes to a non-operation mode, because the processing is low speed, the electric current consumption can be made low. When the changeover device is in an operation mode, vibration compensation control is carried out, and high speed operation is performed.

Although preferred embodiments of the invention have been shown and described, it will be appreciated by those skilled in the art that changes may be made in these embodiments without departing from the principles and spirit of the invention, the scope of which is defined in the claims and their equivalents.

What is claimed is:

1. A photographic device, comprising:
   a vibration compensation system to compensate for vibration of an image on an image forming plane caused by vibration of the photographic device;
   a control unit to control photographic operations and to control the vibration compensation system; and
   a mode changeover device to change a mode of operation of the control unit to a low current consumption mode when a photographic operation has ended, and to change the control unit from the low current consumption mode to the normal operation mode when photographic preparation operations commence,
   wherein the normal operation mode comprises a low-speed processing mode, a medium-speed processing mode and a high-speed processing mode, and wherein the mode changeover device changes the processing mode of the control unit according to whether vibration compensation is performed.

2. A photographic device as recited in claim 1, wherein the mode changeover device changes the control unit to the low-speed processing mode when vibration compensation control is not performed and changes the control unit to one of the medium-speed processing mode and the high-speed processing mode when vibration compensation control is performed.

3. A photographic device as recited in claim 1, further comprising an exposure device to perform an exposure on the image forming plane, wherein the control unit controls the vibration compensation system and the exposure device, and the mode changeover device changes the control unit to one of the low-speed processing mode and the medium-speed processing mode when exposure control and vibration compensation control are not simultaneously processed, and changes the control unit to the high-speed processing mode when the vibration compensation control and exposure control are simultaneously processed.

4. A photographic device, comprising:
   a vibration compensation system to compensate for vibration of an image on an image forming plane caused by vibration of the photographic device;
   a control unit to control the vibration compensation system; and
   a mode changeover device to set an operating mode of the control unit, according to whether vibration compensation is performed, to change a processing speed at which the control unit processes information based on the set operating mode.

5. A photographic device as recited in claim 4, wherein the mode changeover device changes the operating mode of the control unit from a low processing speed mode to a medium processing speed mode when vibration compensation is performed.

6. A photographic device as recited in claim 4, wherein the mode changeover device changes the control unit from a normal operation mode to a low current consumption mode when vibration compensation is ended.

7. A photographic device as recited in claim 4, wherein the control unit is a single-chip microprocessor.

8. A photographic device as recited in claim 6, further comprising a vibration compensation switch to set one of an operation mode and a non-operation mode of the vibration compensation system, wherein the mode changeover device changes the control unit to a low-processing speed mode when the vibration compensation switch is set to the non-operation mode and changes the control unit to a high processing speed mode when the vibration compensation switch is set to the operation mode.

9. A photographic device as recited in claim 4, wherein the mode changeover device changes the operating mode of the control unit to a medium speed operating mode when processes other than vibration compensation control are performed.

10. A photographic device, comprising:

a vibration compensation system to compensate for vibration of an image on an image forming plane;

an exposure device to perform an exposure on the image forming plane; and a control unit to perform vibration compensation control to control the vibration compensation system and to perform exposure control to control the exposure device, wherein the control unit is operated at a low processing speed when the exposure control is performed and the vibration compensation control is not simultaneously performed, the control unit is operated at a medium processing speed when vibration compensation control is performed and exposure control is not simultaneously performed, and the control unit is operated at a high processing speed when the vibration compensation control and exposure control are simultaneously performed.

11. A photographic device, comprising:

a vibration compensation system to compensate for vibration of an image on an image forming plane caused by vibration of the photographic device; and a control unit to perform vibration compensation control to control the vibration compensation system, wherein the control unit is operated in a low processing speed mode when vibration compensation control is not performed and is operated in a high processing speed mode when vibration compensation control is performed.

\* \* \* \* \*

UNITED STATES PATENT AND TRADEMARK OFFICE
CERTIFICATE OF CORRECTION

PATENT NO. : 5,701,521
DATED : December 23, 1997
INVENTOR(S) : Sueyuki OHISHI, et. al.

It is certified that error appears in the above-identified patent and that said Letters Patent is hereby corrected as shown below:

Column 12, Claim 8, line 56, change "6" to --4--.

Signed and Sealed this

Twenty-fourth Day of March, 1998

Attest:

BRUCE LEHMAN

Attesting Officer

Commissioner of Patents and Trademarks